United States Patent
Matsugu et al.

[15] 3,678,546
[45] July 25, 1972

[54] APPARATUS FOR HEAT-SETTING BIAXIALLY STRETCHED FILMS OF THERMOPLASTIC MATERIALS

[72] Inventors: Tomoyuki Matsugu; Ryota Notomi; Teruchika Kanoh, all of Fuji, Japan

[73] Assignee: Kohjin Company, Limited, Tokyo, Japan

[22] Filed: Aug. 26, 1970

[21] Appl. No.: 67,008

Related U.S. Application Data

[62] Division of Ser. No. 819,549, April 28, 1969, Pat. No. 3,577,497.

[52] U.S. Cl. ................................. 26/63, 264/95, 264/210, 264/159, 425/66
[51] Int. Cl. ................................ B29c 17/10, B29d 23/04
[58] Field of Search .................. 18/1 FB, 1 FS, 1 FM, 14 C, 18/14 G, 14 S, 14 A, DIG. 53, DIG. 48; 264/159, 95, 210

[56] References Cited

UNITED STATES PATENTS

| | | | |
|---|---|---|---|
| 2,987,767 | 6/1961 | Berry et al. | 264/95 |
| 3,160,917 | 12/1964 | Berggren et al. | 18/14 S |
| 2,896,262 | 7/1959 | Herrmann | 18/1 FB X |
| 3,355,768 | 12/1967 | Ryan | 18/14 S |
| 2,923,194 | 2/1960 | Ambler et al. | 18/14 C UX |
| 3,231,651 | 1/1966 | Cheney | 264/210 X |
| 3,303,529 | 2/1967 | Boggs | 18/14 A X |

*Primary Examiner*—Robert L. Spicer, Jr.
*Attorney*—Thomas R. O'Malley, George F. Mueller and Eugene G. Horsky

[57] ABSTRACT

Apparatus for simultaneously heat-setting of a pair of flat, biaxially oriented films formed of thermoplastic material.

6 Claims, 5 Drawing Figures

APPARATUS FOR HEAT-SETTING BIAXIALLY STRETCHED FILMS OF THERMOPLASTIC MATERIALS

This application is a division of my application Ser. No. 819,549, filed Apr. 28, 1969, now U.S. Pat. No. 3,577,497.

The present invention relates to an apparatus for simultaneously heat-setting a pair of flat, biaxially stretched films formed of crystalline thermoplastic materials.

It is well recognized that certain properties of films formed of crystalline thermoplastic materials are greatly enhanced by stretching of such films along two mutually perpendicular directions to biaxially orient the molecules thereof. It is also well known that such biaxially stretched films may be heat-set to improve their dimensional stability.

In conventional heat-setting methods, a biaxially stretched, flat film formed of crystalline thermoplastic material is passed into a tenter frame, where its opposite edges are gripped to minimize or prevent shrinkage at elevated temperatures, afterwhich the film is heated and subsequently cooled before being discharged from the tenter frame. The temperature to which the film is heated during heat-setting thereof will depend upon the particular crystalline thermoplastic material from which the film is formed as well as the intended use of the resulting heat-set films. Such temperature may range from above the temperature employed during biaxial stretching of the film up to but below the crystalline melting temperature range of the thermoplastic material from which the film is formed.

It is not possible, however, to heat-set a biaxially stretched tubular film, in its collapsed or flattened condition, using conventional methods and apparatus since the two overlying layers of the collapsed tubular film are adhered to each other during the heat-setting method and are, therefore, difficult to separate into individual sheets. This adherence of the overlying layers of the collapsed tubular film is due to the tension which is exerted by the shrinkage stresses developed within the film layers during the heating thereof and also by the less polymerized parts and additives which ooze out from the films at elevated temperatures.

Conventional methods and apparatus may be employed in heat-setting a biaxially stretched tubular film providing such film, in its collapsed condition, is slit along one of its edges, opened into a flat sheet, and then delivered to a tenter frame capable of handling a sheet of such width. Alternatively, the collapsed tubular film may be slit along both of its edges to provide two individual sheets which are delivered to separate tenter frames for heat-setting. Both of these procedures involve a large capital investment in equipment and expensive operating conditions. Accordingly, a primary object of this invention is to provide a generally new or improved and more satisfactory apparatus for heat-setting biaxially stretched tubular films formed of crystalline thermoplastic materials.

Another object is the provision of an apparatus for simultaneously heat-setting a pair of biaxially stretched flat films formed of thermoplastic material without adhering such films to each other.

Still another object is an improved heat-setting apparatus which is particularly adapted for use with biaxially stretched tubular films formed of crystalline thermoplastic materials.

A still further object is the provision of an apparatus, for use in simultaneously heat-setting a pair of biaxially stretched films formed of thermoplastic material, which involves no significant increase in equipment investment or higher operating costs over that entailed with conventional heat-setting apparatus.

The above and other objects of the invention are achieved by an apparatus in which a pair of flat films, which had been biaxially oriented by stretching at elevated temperatures, are disposed in overlying relationship, together gripped along their opposite edges to prevent contraction thereof in a transverse direction at elevated temperatures, heated to a temperature sufficient to heat-set the same and then cooled while the opposite edges thereof remain gripped, with the overlying films being maintained in spaced apart relationship during the heating and cooling thereof.

More particularly, the pair of flat films are continuous and may be provided as by collapsing or flattening a continuous, advancing biaxially stretched tubular film and slitting the same along opposite longitudinal edges thereof. The tubular film may be biaxially stretched by any known methods and apparatus. The overlying films which are provided by slitting of the biaxially stretched tubular film are heat-set and cooled concomitantly with the continuous advancement thereof.

It is essential in the method practiced with the apparatus of the present invention that the overlying films be maintained spaced from each other a distance of not less than 2 mm. throughout the heating and cooling stages so as to prevent such overlying films from adhering to each other. This may be achieved by providing a layer of gaseous medium, such as air, between the films, as by merely moving the films at a sufficiently high rate of speed as to cause air from the ambient atmosphere to pass between such films. Alternatively, a layer of gaseous medium may be provided by discharging a stream of gas, such as air, in-between the films by means of a nozzle located in a position following that at which the tubular film has been slit so that the discharged gas streams travel concomitantly with the advancing, overlying films.

In a preferred embodiment of the invention, as hereafter described in detail, a pair of moving members are disposed between the overlying films inwardly of their gripped edges, with such members being positively moved at substantially the same rate as that at which the overlying films are together advanced.

As heretofore mentioned, the temperature at which the overlying films are heat-set will depend upon the particular thermoplastic material from which the films are formed and the intended use of the resulting heat-set films. The temperatures used will extend from a temperature above that used during the biaxial stretching of the tubular film and below the crystalline melting temperature of the particular thermoplastic material from which the films are formed. Heat-setting of films formed of crystalline polypropylene, for example, has been successfully achieved using temperatures of about 160° C. Preferably, the exposed sides of the overlying films are simultaneously heated to substantially the same temperature and are subsequently both cooled simultaneously.

More particularly, the apparatus of the present invention includes a tenter frame having endless belt gripping means for engaging with the opposite longitudinal edge portions of a pair of flat, continuous films formed of thermoplastic materials which are disposed in overlying relationship, means for moving the belt gripping means so as to advance the films in unison, means for maintaining the overlying films in spaced apart relationship during the advancement thereof, means for heating the overlying, spaced apart films to a temperature sufficient to heat-set the same as they are continuously advanced and means for cooling the heated, advancing films. The apparatus further includes means for advancing a continuous, flattened biaxially oriented tubular film of thermoplastic material toward the tenter frame and means for slitting or trimming away the opposite longitudinal edge portions of the flattened tubular film as it approaches the tenter frame so as to provide a pair of continuous overlying films.

A nozzle may be provided for discharging a gaseous medium, such as air, in-between the films as they are advanced beyond the slitting means, such gaseous medium serving to maintain the overlying films in spaced apart relationship. Alternatively, the films may be spaced from each other by a pair of endless members, such as endless belts, cords or ropes, together with means for directing one reach of each of such members in-between the overlying films, inwardly of their opposite longitudinal edges, as they enter the tenter frame. Means are provided for driving the endless members at a rate of speed substantially the same as that at which the endless belt gripping means are moved.

The apparatus of the present invention is not limited for use with films formed of any specific crystalline thermoplastic material or containing particular additives, and is especially well adapted for use in a continuous manufacturing operation in which a continuous, advancing tubular film is heat-set following the biaxial stretching thereof.

Figure 1:
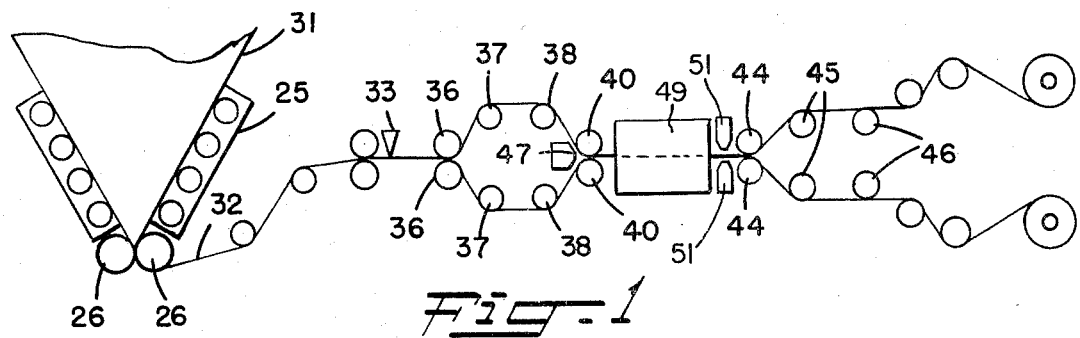
FIG. 1 is a schematic view showing various steps of the method practiced with the apparatus of the present invention.

Shown in FIG. 1 is a fragmentary portion of an apparatus for biaxially stretching a tubular film of crystalline thermoplastic material which includes a V-shaped collapsing frame 25, having a series of idler or driven rolls, and a pair of driven nip rolls 26. A biaxially stretched tubular film 31 is gradually collapsed or flattened as it is advanced through the frame 25 by the driven nip rolls 26. The flattened tubular film, now denoted by the character 32, is guided by suitable rolls as it is advanced toward and relative to a pair of laterally spaced cutting or slitting knives 33.

Figure 2:
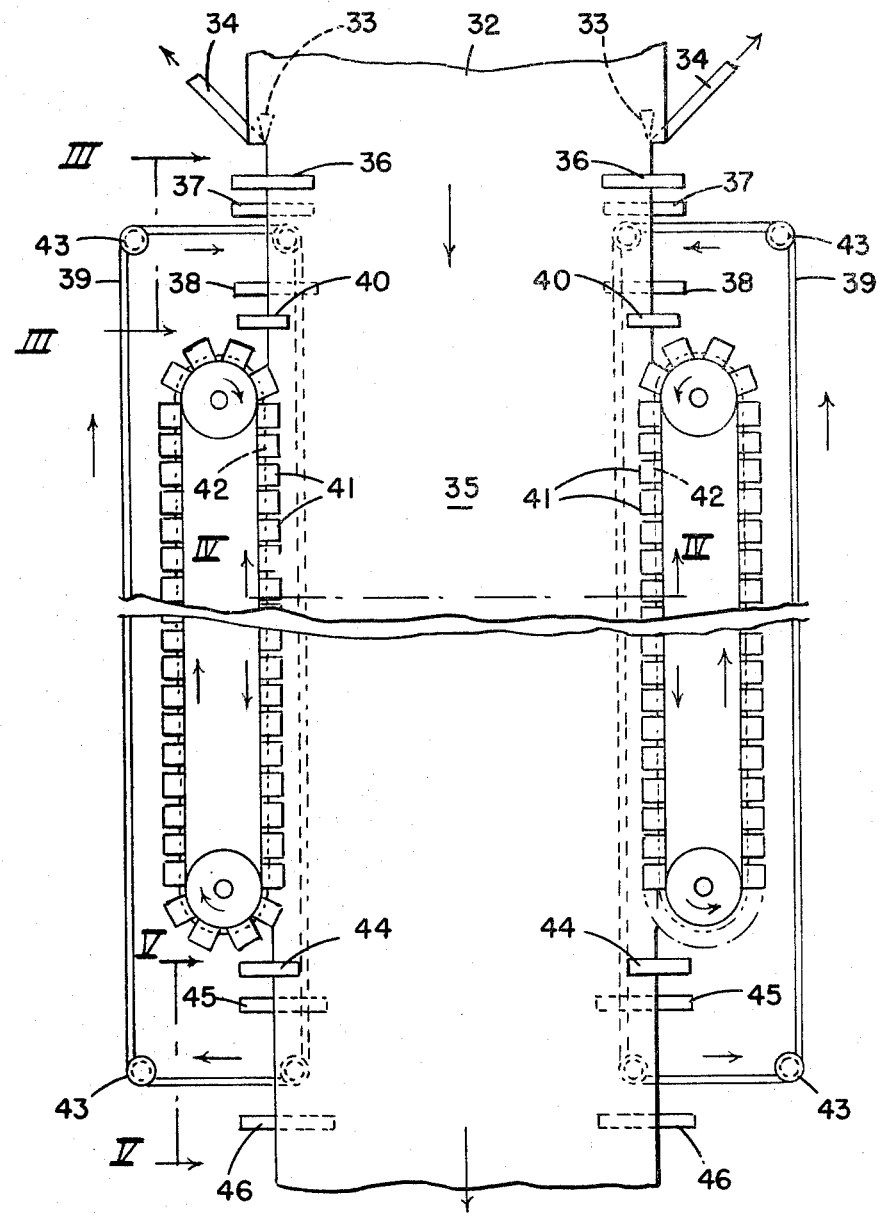
FIG. 2 is a diagrammatic plan view of the apparatus of the present invention.

As best shown in FIG. 2, longitudinal edge portions 34 of the flattened tubular film 32 are trimmed off as such flattened film 32 is advanced relative to the knives 33 providing a pair of overlying flat films 35. The edge portions 34 are directed to a suitable collection means while the overlying flat films 35 are passed between press rolls 36 and then separated from each other by lacing each of such films 35 over like pairs of rolls 37 and 38.

Figure 3:
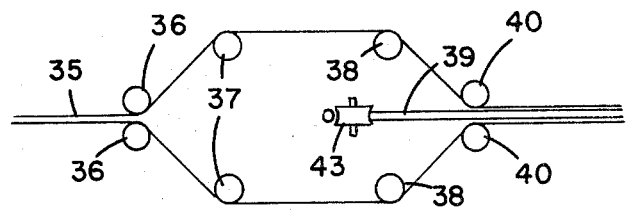
FIG. 3 illustrates a portion of the apparatus as viewed in the direction of lines III—III of FIG. 2.

Referring to FIGS. 2 and 3 of the drawing, during the separation of the overlying films 35, one reach of each of a pair of endless members, such as endless cords 39, is inserted between the films 35 adjacent to their longitudinal edges, after which the films are together passed between press rolls 40. The endless path of each of the cords 39 is outside of a similar endless path followed by tenter clips 41 which are fixed to each of a pair of endless chains 42 of a tenter frame. The endless cords 39 are guided along their respective paths by pulleys 43, with the endless cords 39 and the chains 42 being driven at substantially the same rate of speed and with the opposing reaches thereof traveling in the same direction.

Figure 4:
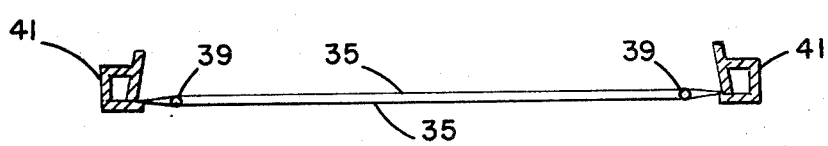
FIG. 4 is a vertical section taken along the lines IV—IV of FIG. 2.

As the overlying films 35 are advanced into the tenter frame, the opposite longitudinal edges thereof are together gripped by the clips 41. As shown in FIG. 4, the opposing reaches of the endless cords 39 are disposed inwardly of the gripped longitudinal edges of the overlying films 35 and thus maintain such films in spaced apart relationship.

With the continued advancement of the overlying but spaced apart films 35 by the endless chains 42, the opposite exposed sides thereof are heated, as by means delivering hot air or by infrared heaters, as indicated at 49. The temperature to which the films are heated is sufficient to heat-set the same and, as heretofore mentioned, is above the temperature employed during biaxial stretching of the tubular film 32 but below the melting range of the crystalline thermoplastic material from which such film is formed. Near the exit end of the tenter frame, the still gripped and spaced apart overlying films 35 are cooled, as by air delivered by nozzles 51.

Figure 5:
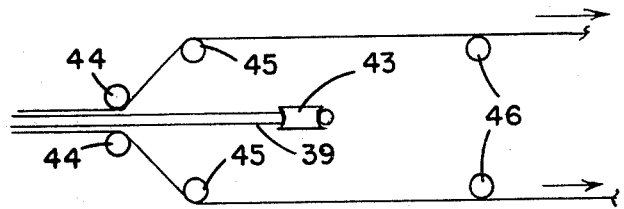
FIG. 5 illustrates a portion of the apparatus as viewed in the direction of lines V—V of FIG. 2.

Subsequently the films 35 are released from the clips 41 and are passed together between press rolls 44 and then separated from each other, as shown in FIG. 5, as by being individually laced over like pairs of rolls 45 and 46. While the films 35 are laced about the separate pairs of rolls 45 and 46, the opposing reaches of the endless cords 39 are removed from therebetween. The now heat-set and separated films 35 may be guided to and collected on individual cores, as shown in FIG. 1.

Generally a pair of endless cords 39 are employed but the number of such endless cords and the location at which such cords are inserted in-between the films 35 is not critical, providing the intended function of keeping such films in spaced apart relationship during the heating and cooling thereof is achieved. For satisfactory practice of the method with the apparatus described, the endless cords 39 should be not less than 2 mm. in thickness.

In lieu of maintaining the film 35 in spaced apart relationship by means of the endless cords 39, as described above, a layer of gas, such as air may be blown in-between such films while they are separated during their passage between rolls 36 and 40. A nozzle 47 may be used for this purpose, with the gas discharged from such nozzle moving concurrently with the advancing films. As a still further alternative, the films 35 may be advanced at a sufficiently high rate of speed as to draw air from the ambient atmosphere and in-between such films as they travel along separate paths between the rolls 36 and 40.

To further illustrate the merits of the present invention, reference is made to the following examples.

A continuous, unoriented tubular film of crystalline polypropylene, having an inside diameter of 216 mm. and a thickness of 625 microns, was formed using the method and apparatus as described in the U.S. Pat. application of Teruchika Kanoh et al., Ser. No. 819,928, filed Apr. 28, 1969, and entitled METHOD AND APPARATUS FOR MAKING TUBULAR FILM, now U.S. Pat. No. 3,655,846. After its formation, this tubular film was continuously advanced at a speed of 1 meter per minute to an apparatus as described in U.S. Pat. No. 3,499,064 of Tsuboshima et al., entitled PROCESS AND APPARATUS FOR PRODUCING BIAXIALLY ORIENTED THERMOPLASTIC TUBULAR FILMS.

Using the method and apparatus described in the above-noted patent, pressurized air was introduced into the tubular film and the film was heated by infrared heaters while being continuously advanced and withdrawn from the stretching apparatus at a rate faster than its delivery so as to stretch the film five times its original size in both its transverse and longitudinal or machine directions.

The resulting biaxially stretched tubular film had a thickness of 25 microns.

Once flattened, the biaxially stretched tubular film was advanced continuously from the stretching apparatus and into the heat-setting apparatus of the present invention. The longitudinal edge portions of the flattened biaxially stretched tubular film were cut away by knives 33 to thereby provide a pair of overlying flat films 35. A pair of endless cotton cords 39, each 5 mm. im diameter, were introduced between the flat films 35, as shown in FIG. 2 of the drawing, with the respective cords being spaced 4 cm. from adjacent longitudinal edges of the overlying films. The two cords together provided an air filled gap between the overlying films.

As these overlying, spaced apart films were gripped by the clips 41 and advanced through the tenter frame, air heated to a temperature of approximately 160° C. was blown against their exposed sides. After being subjected to the heated air for about 6 seconds the films were cooled with air and released from the tenter frame. Longitudinally extending portions of 2 cm. were trimmed away from the opposite edges of the heat-set films and then the films were collected on separate cores.

During the heat-setting of the overlying films, no adherence between the films was experienced. A portion of one of such simultaneously heat-set films was placed in a bath of glycerin heated to 100° C. to determine its dimensional stability. Such film portion was found to shrink less than 1% and in this respect was no different from polypropylene film which was heat-set as a single sheet by known methods and apparatus.

As a further example, a pair of overlying flat biaxially oriented polypropylene films were heat-set using the same procedure and conditions as set forth above, with the exception that the overlying films were maintained in spaced apart relationship by air blown in-between such films at a rate of 0.1 cubic meters per minute and flowing concurrently with the advancing films. The resulting heat-set films exhibited properties substantially the same as described above.

We claim:

1. Apparatus for simultaneously heat-setting a pair of flat, continuous films formed of thermoplastic material which have been biaxially oriented by stretching at elevated temperatures including a tenter frame having endless belt gripping means for engaging with the opposing longitudinal edge portions of a pair of individual, flat, continuous films formed of thermoplastic material which are disposed in overlying relationship, means for moving said belt gripping means for advancing the films in unison, means for maintaining the overlying films in spaced apart relationship during the advancement thereof, means for heating each of the overlying, spaced-apart films to a temperature sufficient to heat-set the films as such films are continuously advanced and means for cooling the heated, advancing films.

2. Apparatus as defined in claim 1 wherein the means for maintaining the overlying films in spaced apart relationship includes a nozzle for discharging a gaseous medium in-between the films as they enter the tenter frame.

3. Apparatus as defined in claim 1 wherein the means for maintaining the overlying films in spaced apart relationship includes a pair of endless members, means for directing one reach of each of said endless members in-between the overlying films and inwardly of their opposite longitudinal edges as they enter into the tenter frame and means for moving said endless members at a rate of speed substantially the same as that at which the endless belt gripping means are advanced.

4. Apparatus as defined in claim 3 wherein said endless members are of a dimension of at least 2 mm. in cross-section.

5. Apparatus as defined in claim 3 wherein said endless members are cords.

6. Apparatus as defined in claim 1 further including means for advancing a continuous, flattened, biaxially oriented tubular film of thermoplastic material toward said tenter frame and means for trimming away longitudinal edge portions of the flattened tubular film as it approaches said tenter frame to thereby provide a pair of individual, continuous, overlying films.

* * * * *